2

United States Patent Office 3,711,463
Patented Jan. 16, 1973

3,711,463
AZIRIDINOMETHYL PHENOLIC COMPOUNDS
Heinz Uelzmann, Cuyahoga Falls, Ohio, assignor to The General Tire & Rubber Company
No Drawing. Filed Mar. 11, 1968, Ser. No. 711,901
Int. Cl. C07d *23/02, 23/06, 31/40*
U.S. Cl. 260—239 E                      13 Claims

ABSTRACT OF THE DISCLOSURE

Aziridinomethyl phenolic compounds of the formula:

$$(Az-CH_2)_n-R$$

wherein

Az is an aziridino or substituted aziridino group, $n$ is a number from 1 to 3, and
R is a phenolic group are prepared by reaction of ethylenimine or equivalent with a polymethylol phenolic compound or its precursors, e.g., a mixture of the phenol and formaldehyde or a formaldehyde donor. A typical compound is 2,6-bis-(N-ethylenimino-methyl)-4-methyl phenol.

BACKGROUND OF THE INVENTION

Ethylenimine is the simplest form of an aziridinyl compound. These products contain one or more aziridino groups of the generic formula:

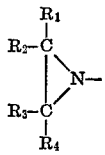

wherein $R_1$, $R_2$, $R_3$ and $R_4$ may be the same or different radicals including hydrogen, alkyl, cycloalkyl, aryl heterocyclo, etc.

This class of compound has received much attention in the past decade because of the potential reactivity of the aziridinyl group with active hydrogen compounds and a host of other reagents. The products have been widely tested for cross-linking reactions, crease-proofing textiles, curing resins, forming polymers and resins and many other purposes.

Varied aziridinyl compounds prepared and investigated in the past have included hydrocarbon derivatives (U.S. 3,231,563), carboxyl derivatives (U.S. 3,038,776 and 3,182,040), phosphoric acid derivatives (U.S. 2,606,901), phosphinic acid derivatives (U.S. 3,205,034), urea derivatives (U.S. 3,266,931) and thiophosphoric acid derivatives (U.S. 2,672,459). Tables of these and other aziridinyl compounds are given in U.S. 3,260,702 and 3,115,490.

The present invention relates to yet another class of aziridinyl compounds, i.e., those containing a phenolic group. Aziridinyl compounds containing a aromatic group and an alcoholic hydroxy group are shown by U.S. 3,165,509 which concerns aziridinyl-propanol compounds which may have an aromatic group substituted upon the propanol group. New compounds of this invention are distinctive in containing aziridinyl groups joined through a methylene group to an aromatic or heterocyclic organic radical that is substituted upon one or more of the carbon atoms of the acylic ring with a hydroxyl group.

OBJECTS

A principal object of this invention is the provision of new compounds containing aziridinyl and phenolic groups joined together by bridging methylene groups.

Further objects include the provision or attainment of the following:

(1) New aziridinomethyl phenolic compounds.
(2) New compounds containing both aziridinyl and phenolic groups which can be reacted with a variety of organic and inorganic substances to produce new combinations of monomeric and polymeric products.
(3) New aziridinyl compounds which may be reacted with proton-active substances to create modified products including phenolic groups which may then be employed in further reactions.
(4) New methods for the production of aziridinyl phenolic compounds.

Other objects and further scope of applicability of the present invention will become apparent from the detailed description given hereinafter; it should be understood, however, that the detailed description and specific examples, while indicating preferred embodiments of the invention are given by way of illustration only, since various changes and modifications within the spirit and scope of the invention will become apparent to those skilled in the art from this detailed description.

SUMMARY OF THE INVENTION

The foregoing objects are accomplished by the invention through the formation of aziridinomethyl phenolic compounds of the formula:

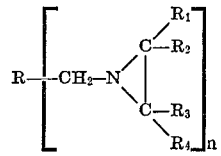

wherein $R_1$ to $R_4$ are hydrogen or 1 to 20 carbon atom monovalent hydrocarbon radicals, R is a phenolic radical and where $n$ is a number from 1 to 3.

The term "phenolic" is used herein to designate not only monocyclic and polycyclic aromatic hydrocarbon compounds such as benzene and naphthalene, but also heterocyclic compounds which exhibit aromatic properties, e.g., pyridine (2-pyridol).

A preferred class of compounds of the invention are those in which the radical R is a monocyclic aromatic hydrocarbon radical substituted by one or more —OH groups.

Another preferred class of compounds of the invention are those in which $R_1$, $R_2$, $R_3$ and $R_4$ are all hydrogen or the aziridinyl group in substituted with only one alkyl group containing 1 to 4 carbon atoms.

The new compounds may be advantageously prepared by reacting an aziridinyl compound of the formula:

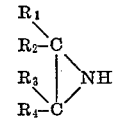

I wherein $R_1$, $R_2$, $R_3$ and $R_4$ have the meaning hereinbefore defined, with a phenolic compound of the formula:

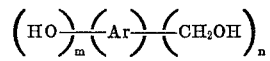

II wherein

Ar is a multivalent organic radical having aromatic type unsaturation,
$m$ is an integer from 1 to 3, and
$n$ is an integer from 1 to 3.

These methylol phenols can be made by reacting the alkali metal salt of a phenolic compound, a phenate, with the desired amount of $H_2C=O$ to give the mono, di- or trimethylol derivative when they can be used as such or treated with a weak acid (i.e., acetic acid), $CO_2$ or $H_2S$ to liberate the free methylol phenolic compound. Dimethylol phenolic compounds are obtained by using a 4-alkyl phenate.

A preferred class of phenolic compounds for use in this reaction are dimethylol phenols of the formula:

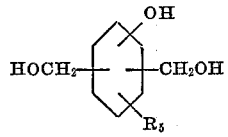
III wherein $R_5$ is hydrogen, hydroxyl or 1 to 4 carbon atom alkyl.

In lieu of phenolic compounds II and III, the corresponding phenolate or salt (i.e., Na or K salt of 2,6-dimethylol phenol $(HOCH_2)_2C_6H_3ONa$) can be used. The free aziridinophenolic compound can be obtained by treatment of the salt to neutralize it with weakly acidic compounds like acetic acid, $CO_2$, $H_2S$ etc. or similar material to remove the alkali metal element without reacting with the aziridinyl groups; this can be done in water or aqueous alcoholic solutions.

Also, in lieu of the phenolic compounds II and III, one may use a mixture of an alkali metal salt of the corresponding phenolic compound (unsubstituted by methylol groups), formaldehyde or a formaldehyde donor and the aziridinyl compound. The preparation can also be effected by direct condensation of the free phenol, the aziridinyl compound and formaldehyde but this method is less preferred as it gives poor results. As an alternative, one may use the phenol free of methylol groups and methylol aziridines of the formula:

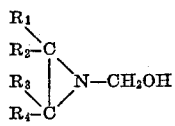
IV where $R_1$–$R_4$ have the meaning as hereinbefore defined. Alternatively, the corresponding alkali metal phenate can be reacted with a compound of Formula IV and then treated with a weak acid and so forth to liberate the free aziridino phenolic compound.

As a further method of preparation, one may use halomethyl phenols of the formula:

V wherein Ar, m and n have the meaning hereinbefore defined, and carry out the reaction with the aziridinyl compounds I in the presence of a hydrohalide scavenger, e.g., a tertiary amine like trimethyl amine, alkaline materials, etc.

The methyl halophenolic compounds are prepared by reacting a mono, di or trimethylol phenolic compound with a hydrogen halide such as HBr, HCl and so forth.

Some of the various reactions that are involved in these methods of preparation are illustrated by the following equations:

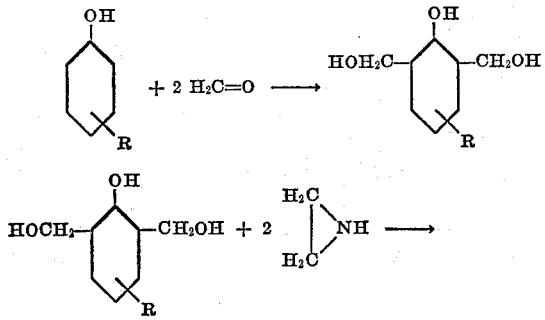

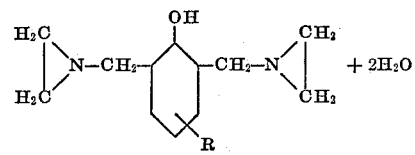

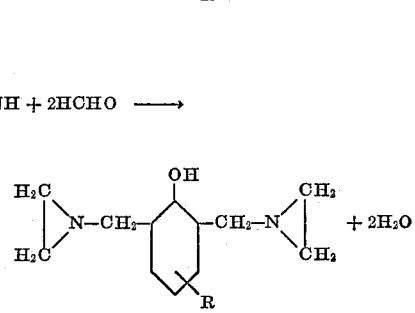

The reagents I, II and III as hereinbefore defined should be free of active or activatable halogen, sulfur, and phosphorous atoms which would interfere with the reaction acid groups. In the case of reagent I, the critical group phosphonic acid groups, mercaptans, alkyl halides, acid halides, sulfonyl halides, phosphonyl halides, etc. They should also be free from acid groups such as carboxylic acid groups. In the case of reagent I, the critical groups is the aziridinyl group and in the case of reagents II and III, an essential group or radical is the hydroxyl group directly substituted on an aromatic ring.

DESCRIPTION OF PREFERRED EMBODIMENTS

The following details of actual operations in accordance with the invention and reported data illustrate the further principles and practice of the invention to those skilled in the art. In these examples and through the remaining specification and claims, all parts and percentages are by weight and all temperatures are in degrees centigrade unless otherwise specified.

EXAMPLE 1

2,6-bis-(N-ethyleniminomethyl)-4-methyl phenol

In a glass reaction vessel equipped with stirrer, reflux condenser, and thermometer, a mixture of 154 parts of ethylenimine and 50 parts anhydrous sodium carbonate was heated to 54° C. Then 50 parts of 2,6-dimethylol-4-methyl phenol were added in portions with stirring and after addition was completed the contents were refluxed for 4 hours. After standing overnight, the reaction product was filtered and the excess ethylenimine recovered by vacuum distillation up to a pot temperature of 40° C.

The remaining viscous material was recovered as product and amounted to 73 parts.

*Analysis.*—Nitrogen. Found (percent): 12.28; 13.36. Calcd. (percent): 12.8. Aziridine. Found (percent): 24.2. Calcd. (percent): 39.5.

Part of the aziridine groups were polymerized. When the material was applied as coatings on a clean steel plate and a clean glass plate and heated to 120° C., the material polymerized completely to a hard polymer with good adhesion to the metal and to the glass.

EXAMPLE 2

Reaction of 2,6-dimethylol-4-tert. butyl phenol with ethylenimine

To a dispersion of 50 parts of anhydrous sodium carbonate in 154 parts of ethylenimine, there were added 40 parts of 2,6-dimethylol-4-tert. butyl phenol with stirring. The temperature went to 29° C. After stirring for one day, the temperature was raised to 45–48° C. for 8 hours. The mixture was cooled, filtered and the excess ethylenimine recovered in vacuum.

The residual material amounted to 44 parts and was analyzed as a solution in isopropanol.

*Analysis.*—Nitrogen. Found (percent): 3.9. Calcd. (percent): 10.6. Aziridine.[1] Found (percent): 10.9. Calcd. (percent): 32.0.

The analysis of the reaction product showed that only part of the ethylenimine was introduced. Polymethylenoxy groups formed, too, according to the formula given below. A hard polymer was obtained by heating the reaction product to 120° C.

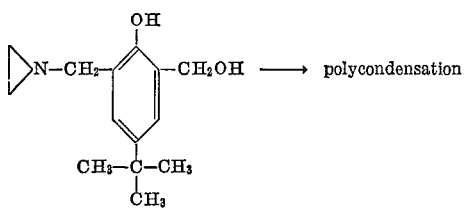 → polycondensation

When part of the reaction product was coated on a clean steel plate and heated to 120° C., it exhibited good adhesion to the steel.

EXAMPLE 3

Reaction product of 2,6-dimethylol-4-methyl phenol and propylenimine

A mixture of 42 parts of 2,6-dimethylol-4-methyl phenol, 171 parts of proplenimine, and 50 parts anhydrous sodium carbonate were slowly heated to reflux and kept there for 4 hours. After cooling and standing overnight the reaction mixture was filtered and the excess propylenimine recovered in vacuum.

The residual viscous material amounted to 61.5 parts and was dissolved in isopropanol for analysis.

*Analysis.*—Aziridine.[1]

Found (percent): 27.70. Calcd. (percent): 34.1. Nitrogen. Found (percent): 7.42. Calcd. (percent): 11.2.

EXAMPLE 4

Preparation of an adhesive with epoxy resin 2,6-bis-(N-ethyleniminomethyl)-4-methyl phenol, 40 parts, and 30 parts of "Epon 828" epoxy resin were thoroughly mixed. The mixture was then used as an adhesive to secure two steel plates together. An excellent bond was obtained between the two steel plates in 2 to 3 hours at room temperature (25° C.).

The pot life of the mixture was 40 minutes at about 25° C. after which time it was converted into a hard resin.

EXAMPLE 5

Potassium salt of 2,6-bis-(N-ethyleniminomethyl)-4-methyl phenol

To a solution of 56 parts of KOH pellets in 200 parts of water, there was added with stirring 108 parts of p-cresol to form the potassium p-cresolate. Then the mixture was cooled to 30° C. and 90 parts of ethylenimine added.

At a temperature range of 30 to 35° C. there was then added dropwise with stirring 170 parts of 37% aqueous formaldehyde. After addition was completed, the reaction mixture was heated to 50° C. for 2 hours in a water bath.

The resulting solution was clear and was used for impregnating fibers, e.g., a cotton cloth was dipped into this solution, pressed to remove excess liquid and dried at 100° C. Then, the treated cloth was passed through diluted acetic acid to obtain the free phenolic compound on the fiber. After that the treated cloth was dried again at 100° C., and on cooling to room temperature, it was tested and found to be water repellent.

The free phenolic product can also be obtained from the solutions of the potassium or sodium salt by treatment with carbon dioxide. Hydrogen sulfide was also used to generate the free phenol. However, the addition of an excess of $H_2S$ will result in its reaction with the aziridine groups.

EXAMPLE 6

The sodium salt of 2,6-bis-(N-ethyleniminomethyl)-4-methyl phenol was obtained according to Example 5 by replacing the potassium hydroxide with 40 parts of sodium hydroxide pellets.

The sodium salt was found to be more difficulty soluble in water and is best prepared in an alcoholic solution.

DISCUSSION OF DETAILS

The aziridinyl compounds (reagents I and IV) and the phenolic compounds (reagents II, III and V) may be, in many cases, obtained commercially although their preparation using known procedures may be used to obtain them, particularly the more highly substituted high molecular weight compounds. Advantageously, these reagents may be freshly purified such as by distillation immediately prior to use in carrying out the reactions as herein described in order to remove polymerization inhibitors and other additives or impurities which might be present in the products.

Representative examples of aziridinyl compounds of the structure of reagent I as hereinbefore defined include:

ethylenimine
2-methyl aziridine
2-ethyl aziridine
2,2,3,3-tetramethyl aziridine
2-butyl aziridine
2-methyl-3-propyl aziridine
2-methyl-3-butyl aziridine
2,2-dimethyl-3-ethyl aziridine, and
2,2-diethyl aziridine Representative examples of 1-methylol aziridine compounds (reagent IV above) include the 1-methylol aziridine compounds corresponding to the above list of aziridinyl compounds. They are prepared by reacting the corresponding aziridinyl compound with formaldehyde:

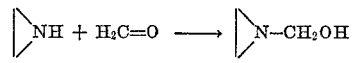

The chemical structure of the aziridinyl reagent employed in the reactions effects the chemical reactivity and physical properties of resulting products. Unsubstituted ethylenimine generally creates final products of greatest reactivity. Substitution, particularly with alkyl groups of higher molecular weight, creates final products of lesser chemical activity, and resulting polymeric products made from them are softer.

The products of the invention are also influenced by the structure of the phenolic compound selected from those having the structural formula of reagent II as hereinbefore defined. When the phenolic compound is substituted with lower alkyl groups, e.g., methyl or ethyl, and consequently the phenolic group R is low in molecular weight, polymeric products prepared from mixtures including the resulting adducts are the hardest.

As the molecular weight of the substituents on the phenolic radical or the molecular weight of the radical itself is increased, resulting products generally become softer. Frequently, also, the chemical reactivity of the adduct is lower.

---

[1] based on $-N\begin{smallmatrix}CH_2\\|\\CH_2\end{smallmatrix}$

Representative examples of phenolic compounds within the class of reagents II (and their salts) as hereinbefore defined include:

4-methylol phenol
2,6-dimethylol phenol
2,4-dimethylol phenol
2,6-dimethylol-4-methyl phenol
2,6-dimethylol-4-butyl phenol
2,6-dimethylol-1,4-dihydroxy benzene
2,4,6-trimethylol phenol
2,3,8-trimethylol naphthol
2,6-dimethylol-o-xylenol
4,6-dimethylol pyrocatechol
2,4-dimethylol resorcinol
2,6-dimethylol phloroglucinol
2,6-dimethylol-3,5-dimethoxy phenol
2,6-dimethylol-5-methoxy resorcinol
4,6-dimethylol pyrogallol
4,6-dimethylol-3-methoxy pyrocatechol
3,5-dimethylol-2-hydroxy pyridine
3,5-dimethylol-1-hydroxy phenanthrene
2,7-dimethylol-1-hydroxy naphthalene, and their corresponding alkali metal salts (phenates).

Phenolic compounds which can be used include phenol, cresol, xylenol, pyrocatechols, resorcinols, phloroglucinol, pyrogallol, mono- and multi-hydroxy naphthalenes and phenanthrenes, mono- and multi-hydroxy heterocyclic compounds such as 3-pyridol, 4-pyridol, 2,4-pyridine diol, 2,4,6-pyridinetriol and the like all of which can contain lower alkyl radicals and the like as well as the corresponding alkali metal salts of these phenolic compounds.

The mono, di and tri halo (preferably chloro) methyl phenolic compounds to employ are those corresponding to the aforementioned methylol phenolic compounds and the like such as 4-chloromethyl phenol, 2,6-di(chloromethyl) phenol, 2,4,6-tri (chloromethyl) phenol, etc.

Representative examples of aziridinyl phenolic compounds within the new class of compounds of the invention include:

2,6-bis(N-ethyleneiminomethyl)-4-methyl phenol
2,6-bis-(N-ethyleneiminomethyl)-4-butyl phenol
2,4-bis-(N-propyleniminomethyl)-6-methyl phenol
3,5-bis-(N-ethyleniminomethyl)-2-hydroxy pyridine
2,4,6-tris-(N-propyleniminomethyl) phenol
2,7-bis-(2,3-dibutyl aziridinomethyl)-1-hydroxy naphthalene
2,4-bis-(2,3-dibutyl aziridinomethyl)resorcinol
2,6-bis-(2-methyl-3-propyl aziridinomethyl) phloroglucinol
4,6-bis-(N-ethyleniminomethyl) pyrogallol
4,6-bis-(N-propyleniminomethyl)-3-methoxy pyrocatechol
3,5-bis-(N-ethyleniminomethyl)-1-hydroxy phenanthrene
2,6-bis-(2,3-dimethyl-2-propyl aziridinomethyl)-o-xylenol, and
2,6-(N-ethylenimonomethyl)-5-methoxy resorcinol Determination of chemical composition of products resulting from practice of the invention can be obtained by analysis of reaction products for nitrogen content, aziridine content and other atom or molecular group content according to established analytical procedures. Aziridine content is a particularly useful technique and known method for such analysis involves opening of the aziridine ring as reported in J.A.C.S. 77, 5918 (1955).

In carrying out the reactions as described hereinbefore for the production of the new aziridinyl phenolic compounds, the reaction conditions may be varied and will depend to some extent on the exact reagents used in preparing the desired products. Temperatures between 10 and 100° C. are useable although temperatures between 20–80° C. and especially 30–60° C. are advantageously used with the majority of reagents. Proportions of the reagents may also be varied, e.g., a ratio of from about 1 to 3 mols of aziridinyl reagent for each mol of phenolic reagent (depending on the number of methylol groups present). Generally an excess of the aziridinyl compound is used to drive the reaction forward and increase yields. Where a reaction using formaldehyde is involved, the mols of aziridine compound used should be equal to or greater than the number of mols of $H_2C=O$. Generally as above the number of mols of formaldehyde or methylol aziridine compound will vary from about 1 to 3 per mol of phenolic compound. In the case where part of the methylol groups are unreacted, the reaction product may undergo a polycondensation like phenol formaldehyde condensation products to form a resinous polymer. Polycondensation can also occur involving the aziridine groups attached to the phenolic nucleus. Usually the reactions are conducted using a solvent or diluent that is unreactive to the reagents, when an HCl scavenger is employed and this may also serve as a diluent. At least one mol of scavenger is used for each calculated mol of HCl that will be formed and advantageously 2 to 10 mols of scavenger per mol of evolved HCl is used. Tertiary amines such as triethyl amine, phenol dimethyl amine, etc., heterocyclic basic compounds known in the art as useful as HCl scavengers may be employed.

Recovery of the desired product from the reaction mixture may be performed in any suitable manner, e.g., solvent extraction, distillation, vacuum distillation, adsorption, chromatographic separation, etc.

The new aziridinyl phenolic compounds are reactive compounds and may be used for a variety of purposes. The aziridinyl groups react with organic acids and polymers containing —COOH groups to form aminoethylene groups. The mechanism is reported in J. Org. Chem., 9, 500 (1944). The aziridinyl group can react with epoxides to form hydroxy ethylene groups (see U.S. 2,475,068) and with hydroxy groups, e.g., as present in polyols, epoxy resins, etc., to form aminoethoxy groups (see J.A.C.S., 77, 5116 (1955)). The phenolic OH group(s) can react with epoxides for further cross-linking or chain-extension. There is, accordingly, in such polymer reactions possible multiplication of functional groups using the new compounds rendering these materials useable in adhesives and in cross-linking and chain-extending reactions. Combinations of cross-linking and chain-extending in controlled proportions and degrees in polymers is also possible using mixtures of the new compounds, e.g., propellants.

In the case of methylol phenols used in the preparations of the invention, a part of the methylol groups may be left unreacted and then made to undergo poly-condensation like phenol-formaldehyde condensation products.

Monomeric or polymeric carboxylic acids, anhydrides, acid chlorides, mercaptans, sulfonic acids, phosphonic acids, or their corresponding acid halides, epoxy compounds, amines, hydrazines, amides, hydrazides, and other functional groups which react with the aziridine ring, can be modified or cross-linked with the above-mentioned aziridinyl phenolic compounds. Polymers without functional groups can also be blended into these compositions as also may plasticizers, elastomers and the like. The new compounds can be used as chain terminators for —COOH containing polymers such as carboxylated polybutadienes, butadiene-styrene-acrylic acid copolymers, carboxyl terminated polyureas and urethane, etc. In such reactions, the resulting polymers acquire phenolic groups, with the properties associated with such groups. Such copolymers are, accordingly, useful in making adhesives, coatings in combination with phenol-aldehyde resins, biocidal products for organisms for which phenols are toxic, intermediates in preparation of phenoxy amino compounds and the like.

A particular useful type of product which can be prepared using the new products of the invention are adhesives or cements. Combinations of the new products with epoxy resins create adhesive of great cohesive and adhesive strength.

The term "epoxy resin" as used herein and in the accompanying claims means any organic substance containing a plurality of epoxy groups capable of being copolymerized or otherwise reacted with the other compounds to form high molecular weight solid polymers. A preferred class of the epoxy resins are the reaction products of a polyhydric phenol and a polyfunctional halohydrin in which the reaction product contains a plurality of vicinal epoxy groups. However, other monomers or low polymers containing a plurality of epoxy groups reactive with the aziridinyl phenolic compounds may be employed. In general, the epoxy resins are complex polymeric reaction products formed by reaction in caustic of products containing one or more hydroxyl groups and another compound containing at least one epoxy group and some other reactive group such as halogen. Typical polyhydric compounds are phenols including resorcinol, various bisphenols and the like. The essential feature of the epoxy resins is the presence therein of a plurality of terminal epoxy groups. The molecular weight of these products can be varied depending to some extent upon relative proportions of reactants used in their preparation and the extent to which the reaction is carried out. Generally, the molecular weight, viscosity and similar variables in the epoxy resins are not critical and the art of use of these compounds has progressed to the point where those familiar with the technology can choose from commercial available products a wide variety of materials tailored to provide particular desired properties in the final product. Some examples of substances encompassed by the term "epoxy resins" as used herein and contemplated for use in accordance with the invention include:

diglycidyl ether of bisphenol A
diglycidyl ether of pentane diol
adduct of diglycidyl ether of pentanediol and bisphenol A
adduct of diglycidyl ether of bisphenol A and a polyalkylene glycol
(3,4 - epoxy - 6 - methyl cyclohexyl methyl)-3-epoxy-6-methyl cyclohexane carboxylate
1-epoxyethyl-3,4-epoxy cyclohexane diglycidyl ether
adduct of epichlorohydrin and trihydroxy
 diphenyl dimethyl methane
adduct of epichlorohydrin and phloroglucinol
adduct of epichlorohydrin and erythritol, and
adduct of 3-chloro oxetane and bisphenol A.

Adhesive formed of the epoxy resin and the new aziridinyl phenolic compounds may advantageously include a curing or hardening catalyst. Any compounds known in the art to be useful for this purpose may be used e.g., see U.S. 3,144,417. Based upon total weight of the adhesive composition, generally satisfactory results can be obtained using between about 0.1 to 10% by weight of the catalyst. Most advantageous results are obtained by forming the adhesive compositions to have a parts by weight ratio of epoxy compound to aziridinyl phenolic compound to catalyst of about 1:0.5:0.01 to 1:1.5:0.1.

Adhesive compositions of the invention may be employed for any application for which epoxy type adhesives are known to be useful, e.g., cementing of shoe heels or parts, applying floor and wall coverings, installing gaskets, forming molded articles, applying covers to handles or panels, producing vehicle tires, splicing abrasive or other belts, cementing upholstery materials and the like. A particularly useful application of the adhesives is in the formation of laminated products in which two or more webs are fixed together with an inner layer of cured adhesive formed in accordance with the invention.

In forming plastic, adhesive or other compositions using the new products of this invention as ingredients or as reactants, it may be advantageous to incorporate other added materials, e.g., fillers, dyes, pigments, plasticizers, extenders, inhibitors, fire-resistant materials and the like. Examples of materials which fall in these categories and which may be usefully included in new adhesive compositions include: zinc oxide, carbon black, iron oxides, chalk, titanium dioxide, silicon dioxide, mica, asbestos, glass fibers, cellulosic fibers, synthetic fibers, alumina, antimony oxide, zinc borate, synthetic rubbers, polyester resins, polyurethane resins and the like. Such added materials may comprise 0.01 to 50% of the total adhesive and advantageously between about 0.1 and 10%. Where dilution of the compositions may be desirable for spreading or coating purposes or for other reasons, solvents or inert extenders may be employed. Examples of useful solvents include hydrocarbons such as heptane, cyclohexane, toluene, benzene, halogenated hydrocarbons, such as carbon tetrachloride, chloroform, trichloroethylene, and the like, or organic esters, ethers and similar organic liquids normally classified as solvents. When and if used, solvents may advantageously comprise 10 to 90% by weight of the total composition.

The embodiments of the invention in which an exclusive property or right is claimed are defined as follows:

1. Aziridinomethyl phenolic organic compounds of the formula:

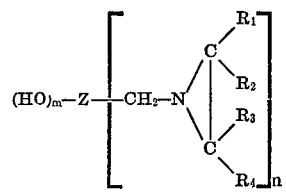

wherein:
Z is a multivalent cyclic organic radical selected from the group consisting of phenyl, lower alkyl phenyl, lower alkoxy phenyl, naphthyl, pyridyl and phenanthryl, said radical being substituted with the hydroxyl and aziridinomethyl groups as specified in said formula,
$m$ is the number 1, 2 or 3,
$n$ is the numer 2 or 3, and
$R_1$, $R_2$, $R_3$ and $R_4$ are hydrogen or 1 to 4 carbon atom alkyl radicals.

2. The compounds of claim 1 wherein the radical Z is phenyl.
3. The compounds of claim 1 wherein the radical Z is butyl phenyl.
4. The compounds of claim 1 wherein the radical Z is methyl phenyl.
5. The compounds of claim 1 wherein the radical Z is methoxy phenyl.
6. The compounds of claim 1 wherein the radical Z is pyridyl.
7. Aziridinomethyl phenolic organic compounds of the formula:

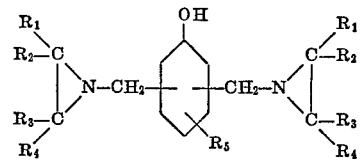

wherein:
$R_1$, $R_2$, $R_3$ and $R_4$ are hydrogen or 1–4 carbon atom alkyl and
$R_5$ is hydrogen, hydroxyl or 1–4 carbon atom alkyl.

8. The alkali metal salt of a compound as claimed in claim 1.
9. The alkali metal salt of a compound as claimed in claim 7.

10. Aziridinyl phenolic-organic compounds of the formula:

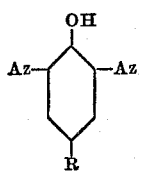

wherein
R is 1 to 4 carbon alkyl and
Az is selected from the group consisting of N-aziridinomethyl and N-propyleniminomethyl.

11. As the compound of claim 10 2,6-bis (N-aziridinomethyl)-4-methyl phenol.

12. As the compound of claim 10 2,6-bis (N-propyleniminomethyl)-4-methyl phenol.

13. As the compound of claim 10 2,6-bis (N-aziridinomethyl)-4-tertiary butyl phenol.

References Cited

UNITED STATES PATENTS 3,261,824   7/1966   Randall et al. _____ 260—239

OTHER REFERENCES

Volod'kin et al.: Izv. Akad. Nauk SSSR, Ser. Khim, 1967, pp. 1592–1596.
Vaughan et al.: J. Org. Chem., vol. 26, pp. 2392–2396 (1961).
Adams (editor-in-chief), Organic Reactions, vol. 1, p. 311 (New York, 1942).
Gandhi et al.: J. Indian Chem. Soc., vol. 39, pp. 306–308 (1962).

ALTON D. ROLLINS, Primary Examiner

U.S. Cl. X.R.

117—135.5; 156—330, 331; 260—2 EC, 47 R, 51 R, 51.5, 296 R, 297 R, 619 F, 621 K, 623 D

PO-1050
(5/69)

UNITED STATES PATENT OFFICE
CERTIFICATE OF CORRECTION

Patent No. 3,711,463  Dated January 16, 1973

Inventor(s) Heinz Uelzmann

It is certified that error appears in the above-identified patent and that said Letters Patent are hereby corrected as shown below:

Column 4, lines 23-33, should read:

---The reagents I, II and III as hereinbefore defined should be free of active or activatable halogen, sulfur, and phosphorous atoms which would interfere with the reaction such as those atoms combined in sulfonic acid groups, phosphonic acid groups, mercaptans, alkyl halides, acid halides, sulfonyl halides, phosphonyl halides, etc. They should also be free from acid groups such as carboxylic acid groups. In the case of reagent I, the critical group is the aziridinyl group and in the case of reagents II and III, an essential group or radical is the hydroxyl group directly substituted on an aromatic ring.---.

Column 6, line 19, which reads "difficulty" should read ---difficultly---.

Signed and sealed this 29th day of May 1973.

(SEAL)
Attest:

EDWARD M. FLETCHER, JR.
Attesting Officer

ROBERT GOTTSCHALK
Commissioner of Patents